(12) United States Patent
Heidrich

(10) Patent No.: US 6,732,986 B2
(45) Date of Patent: May 11, 2004

(54) MAGNET RETAINER AND METHOD FOR FIXING A MAGNET ON A SUPPORT ELEMENT

(75) Inventor: Markus Heidrich, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,451

(22) PCT Filed: Feb. 23, 2001

(86) PCT No.: PCT/DE01/00707
§ 371 (c)(1),
(2), (4) Date: Jun. 4, 2002

(87) PCT Pub. No.: WO01/63726
PCT Pub. Date: Aug. 30, 2001

(65) Prior Publication Data
US 2002/0162939 A1 Nov. 7, 2002

(30) Foreign Application Priority Data
Feb. 26, 2000 (DE) .......................................... 100 09 151

(51) Int. Cl.$^7$ ................................................ F16B 47/00
(52) U.S. Cl. ....................... 248/206.5; 248/683; 310/89

(58) Field of Search .............................. 248/206.5, 683, 248/309.1, 467, 537, 305; 310/89, 154.14, 154.15

(56) References Cited

U.S. PATENT DOCUMENTS

| 4,423,345 A | * | 12/1983 | Nilsson ....................... 310/153 |
| 4,564,894 A | * | 1/1986 | Gonzalez ..................... 362/398 |
| 4,594,525 A | | 6/1986 | Stokes |
| 4,625,392 A | * | 12/1986 | Stokes .......................... 29/598 |
| 5,216,306 A | * | 6/1993 | Nakazawa et al. ............. 310/89 |
| 5,399,929 A | * | 3/1995 | Okada et al. .......... 310/154.18 |
| 5,574,421 A | * | 11/1996 | Hickling ..................... 337/343 |

FOREIGN PATENT DOCUMENTS

JP  8-336273  12/1996

* cited by examiner

Primary Examiner—Ramon O. Ramirez
(74) Attorney, Agent, or Firm—Michael J. Striker

(57) ABSTRACT

A magnet mount for at least one magnet includes a carrier element and at least one restraining element. The restraining element is formed as a single piece with the carrier element. The restraining element preferably is formed simply and cost-effectively as a projection protruding from the carrier element.

4 Claims, 4 Drawing Sheets

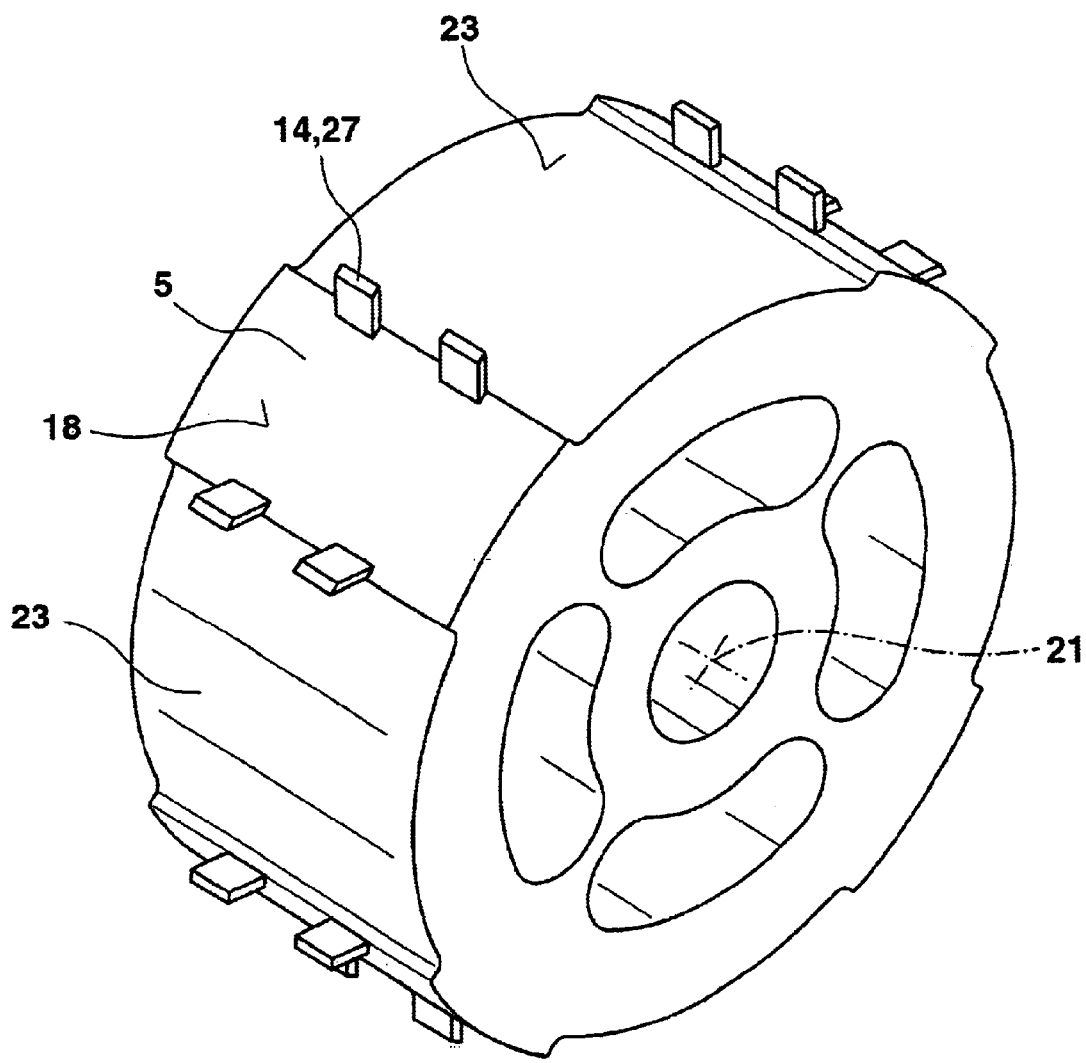

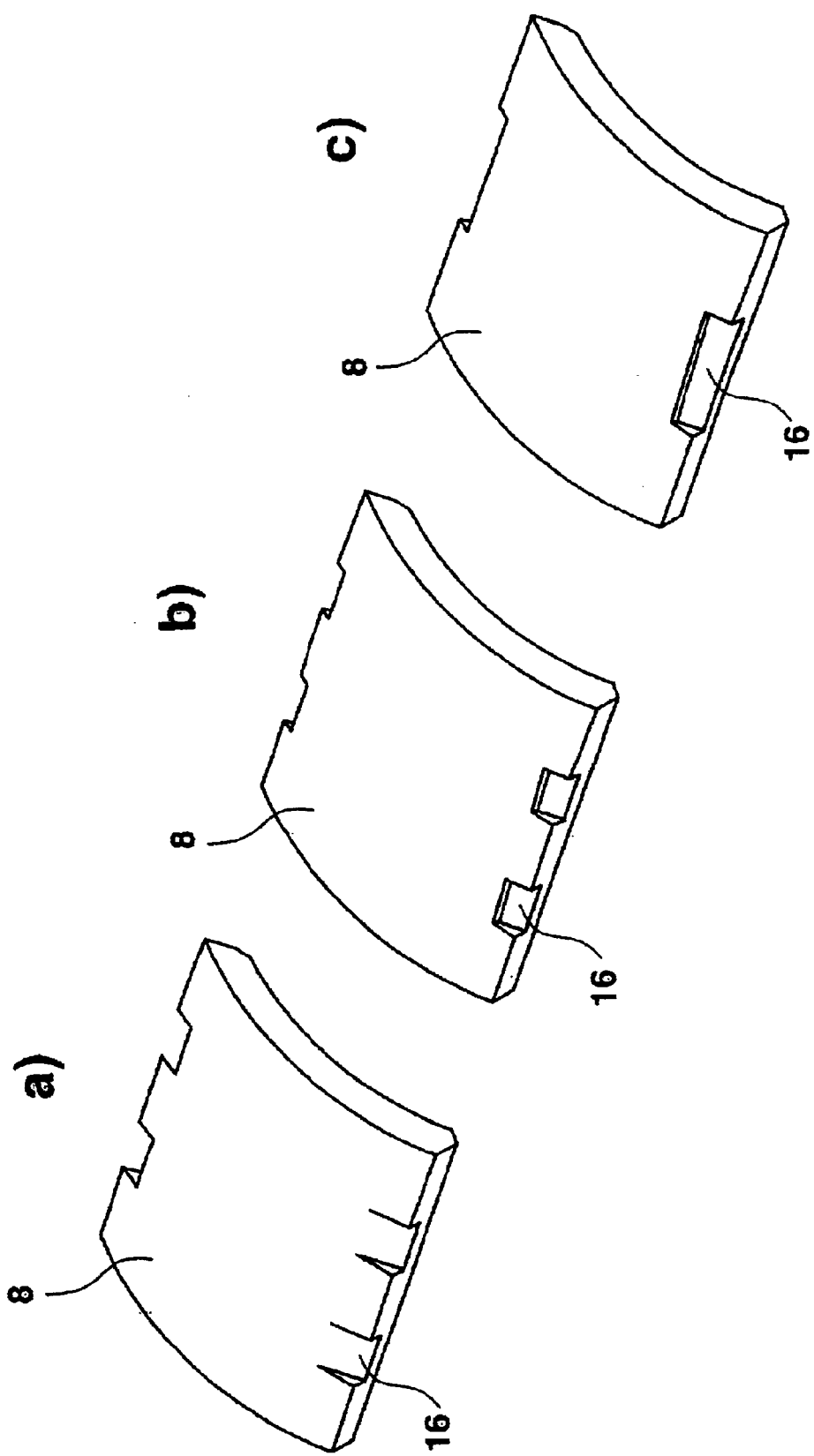

MAGNET RETAINER AND METHOD FOR FIXING A MAGNET ON A SUPPORT ELEMENT

BACKGROUND OF THE INVENTION

The invention is based on a magnet mount and a method for securing a magnet to a carrier element.

It is already known from JP-08336273 that magnets are secured to a carrier ring by way of a restraining element. The restraining element is not a single piece with the carrier ring, however, and must be screwed tightly into place on the carrier ring using two screws for each magnet.

SUMMARY OF THE INVENTION

In contrast, the magnet mount according to the invention and the method according to the invention for securing a magnet to a carrier element have the advantage that magnets can be secured to a carrier element in simple fashion.

It is advantageous to design the restraining element as a projection protruding from of the carrier element, because a simple and cost-effective restraining element can then be produced as a result.

It is also advantageous to produce the carrier element out of sheet-metal laminate, because the restraining element can then be stamped easily, quickly, and cost-effectively out of a sheet-metal panel.

Furthermore, it is advantageous when the magnet has at least one notch in which the restraining element can grip, because an outer radius of the magnet and carrier element is not increased as a result.

An advantageous design of the carrier element has a disc-shaped cross section.

A further advantageous design of the carrier element has a ring-shaped cross section.

The magnet can be secured to the carrier element in advantageous fashion in that the magnet is placed on the carrier element and the restraining element is then deformed so that the magnet is is held in place on the carrier element by way of positive engagement and adherence, so that a simple, quick, and cost-effective magnet securing method is achieved.

Another advantageous method for securing the magnet to the carrier element is to bend the restraining element by action of force so that the magnet can be situated on the carrier element, and the action of force is then removed, so that the restraining element then grips the magnet, so that a simple, quick, and cost-effective magnet securing method is achieved.

BRIEF DESCRIPTION OF THE DRAWINGS

Design examples of the invention are shown in simplified form in the diagram, and they are described in greater detail in the description below.

FIG. 3 shows a further embodiment of a magnet mount designed according to the invention, and FIG. 4a through c show magnets for a magnet mount.

DETAILED DESCRIPTION OF THE PREFERRED EMBODIMENTS

Figure 1:
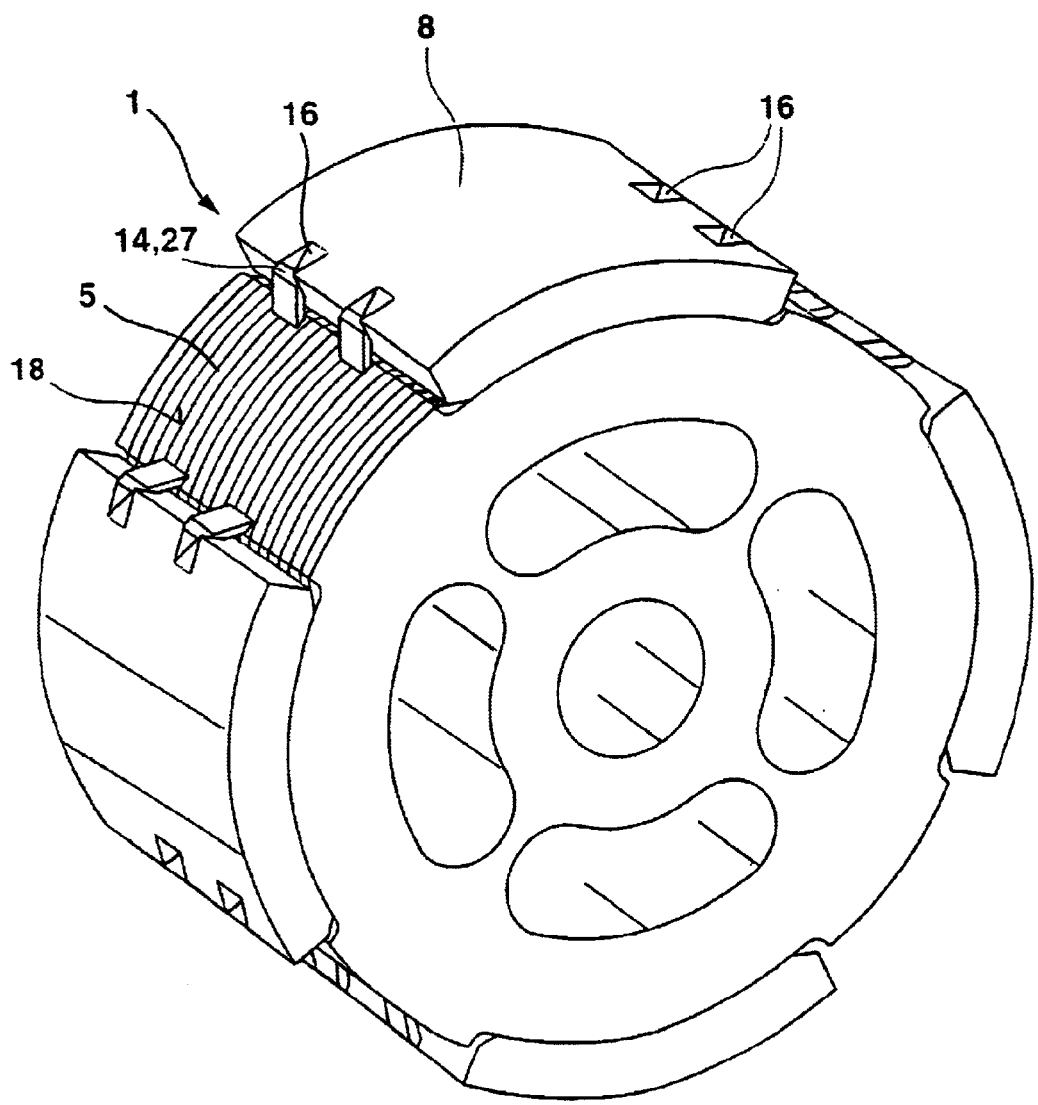
FIG. 1 shows a first embodiment of a magnet mount designed according to the invention.
Figure 2:
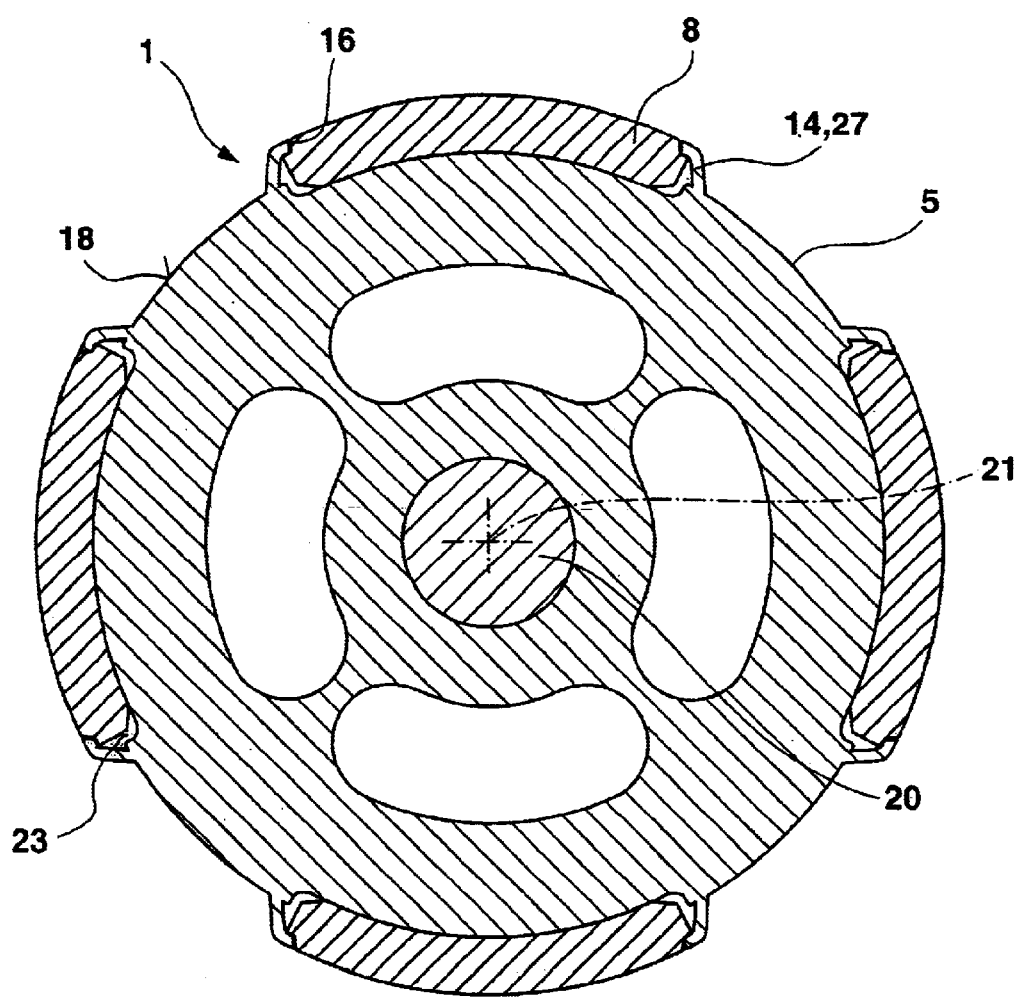
FIG. 2 shows a radial cross section of FIG. 1.

FIG. 1 shows a magnet mount 1 and FIG. 2 shows a radial cross section of FIG. 1.

Four magnets 8, for example, are arranged on the carrier element 5 of the magnet mount 1.

In this example, a magnet 8 is secured by way of four restraining elements 14 to a carrier element 5 that are designed as a single piece with the carrier element 5 and can be plastically or elastically deformed. The restraining elements 14 are designed in the shape of a hook, for example.

A magnet 8 has four notches 16, for example, in which the restraining elements 14 grip, in order to secure the magnet 8 to the carrier element 5.

The restraining elements 14 have the shape shown in FIG. 2 and are bent upward so that the magnet 8 can be installed. Instead of the magnet 8, other parts, such as a mirror for a light barrier, can also be secured to the carrier element 5.

The carrier element 5 can have a disc-shaped structure in the radial cross section or, as shown in FIGS. 1 and 2, it can have a ring-shaped structure. The carrier element 5 is thereby designed—as shown in FIG. 1, for example—so that it can be installed on a shaft 20.

Cross ribs connect an outer ring with an inner ring. The shaft 20 and the carrier element 5 have a center line 21. Such a magnet holder is not only suited to holding magnets on an outer circumferential surface 18 of the carrier element 5, but also on an inner circumferential surface. Such a magnet mount 1 is installed in an electric motor, for example, where it forms a rotor, for instance.

The restraining elements 14 do not extend over the outer limit of a magnet 8, for example. This is particularly important when the rotor is to comprise particularly small air gaps within a stator of an electric motor. A recess 23 is provided in the mounting area of the magnet 8 on the carrier element 5 in which the magnet 8 is then located.

FIG. 3 shows a carrier element 5 without magnets 8. The restraining elements 14 are not bent, and they form projections 27 protruding from the circumferential surface 23 and pointing away from the center line 21.

FIGS. 4a through c show embodiments of magnets 8 for a magnet mount 1.

The magnets 8 are ring are segments, for example, having the same thickness, for instance, that are quadrangular in shape, for example, as seen in a top view of the surface having the notches 16.

Two notches 16 each, for example, are then located on the surface of the magnet 8—which then has a convex curvature—along the two edges extending in a straight line on the surface with the convex curvature (FIGS. 4a, 4b). In the embodiment shown in FIG. 4a, the surface of the magnet 8 is uninterrupted as it changes into the notch 16.

FIG. 4b shows a second embodiment of such a magnet 8. In contrast to FIG. 4a, a uniform graduation from the surface of the magnet 8 is provided along the notch 16.

FIG. 4c shows a magnet that has just one notch 16 on one edge which is designed to be wider than a notch 16 as shown in FIGS. 4a, b, so that a correspondingly wider restraining element 14 that applies sufficient restraining force can catch on a greater gripping surface.

The carrier element 5 can also be a laminated core formed out of individual sheet-metal laminates 31. During manufacture of a sheet-metal laminate 31 using a stamping tool, sheet-metal laminates are produced without projection 27 and with projection 27.

The different sheet-metal laminates 31 are stacked and bundled accordingly.

The securing of magnets 8 to the carrier element 5 can be carried out in many fashions.

The magnets 8 are introduced into the recess 23, and the projections 27 are then pressed into the notches 16 of the magnets 8. The projections 27 are thereby designed so that, after they are bent into the notch using an appropriate stamp, they lie on the surface of the magnet 8 in positive fashion and no longer protrude above its surface. The notch 16 in the magnet 8 and the shape of the restraining element 14 (length, width, bending), are designed and adapted so that the restraining element 14 and the notch 16 reliably withstand the stresses produced during operation, via rotation, for example.

A further method for securing the magnet 8 to the carrier element 8 can require that the projections 27 be bent (FIG. 2), then the magnet 8 is introduced into the recess, and then, by removing the action of force on the projections 27, the projections come to rest in the notch 16 of the magnet 8 by way of positive engagement and adherence.

Potential magnets are those, for example, that have been manufactured via hot extrusion, for instance, i.e., the notches can be applied directly in the manufacturing process, and they do not need to be created subsequently, e.g., via grinding.

What is claimed is:

1. Magnet mount (1) for at least one magnet (8), comprising one cylindrical carrier element (5) with a center line (21) and at least one restraining element (14), characterized in that the restraining element (14) is outwardly formed as a single piece with the carrier element (5), wherein the at least one magnet (8) is disposed outwardly on radially inward displaced peripheral surfaces in the carrier element (5), and wherein the restraining element (14) form-lockingly engages in notches (16) in the at least one magnet (8).

2. Magnet mount according to claim 1, characterized in that the carrier element (5) consists of at least one sheet-metal laminate (31).

3. Magnet mount according to claim 1, characterized in that the restraining element (14) lies in a direction of the center line (21) of the carrier element (5), and wherein said restraining element grips in at least one notch (16) in the magnet (8), wherein said at least one notch (16) is disposed in edges of the at least one magnet running in the direction of the middle line (21) of the carrier element (5).

4. A method for securing at least one magnet (8) to a carrier element (5), comprising the steps of using at least one restraining element (14) outwardly formed as a single piece with the carrier element (5); disposing the at least one magnet outwardly on an inwardly displaced peripheral surfaces in the carrier element (5); engaging the restraining element (14) form-lockingly in notches (16) in the at least one magnet (8); bending the at least one restraining element (14) by the action of force so that the magnet (8) can be situated on the carrier element (5); and removing the action of force so that the restraining element (14) then grips the magnet (8).

* * * * *